United States Patent Office 2,802,825
Patented Aug. 13, 1957

2,802,825

CYCLOPENTANOPHENANTHRENE COMPOUNDS AND PROCESS FOR THE PRODUCTION THEREOF

Hyp J. Dauben, Jr., Seattle, Wash., and Howard J. Ringold and Bjarte Loken, Mexico City, Mexico No Drawing. Application June 25, 1953,
Serial No. 364,216

Claims priority, application Mexico June 28, 1952

16 Claims. (Cl. 260—239.55)

The present invention relates to novel cyclopentanophenanthrene compounds and a novel process for the production thereof.

More particularly, the present invention relates to a novel process for the production of ethyleneketals of steroid ketones, certain novel ethyleneketals of steroid ketones and a process for the chemical transformation of functional groups of steroid ketones with the protection of the ketone group or groups by formation of an ethyleneketal thereof.

The formation of ethyleneketals of steroid ketone has hitherto involved the reaction of these ketones with polyvalent alcohols or with the corresponding alkalene oxides in the presence of acid catalysts. In general, the formation of these ketals by these methods has not been altogether satisfactory.

In accordance with the present invention, it has been discovered that ethyleneketals of steroid ketones may be prepared in high yield by a novel interchange reaction with ethyleneketals of aliphatic aldehydes or ketones, i. e., the compounds generally known as the 1,3-dioxolanes.

It has further been discovered in accordance with the present invention that it is possible to selectively form the ketal of one or more of the keto groups in the molecule of a steroid ketone having a plurality of ketone groups so as to selectively so protect certain of the ketone groups against further reaction. Further, in accordance with the present reaction, it has been discovered that ethyleneketals of steroid ketones may be further subjected to reaction to modify other portions of the molecule without effecting the ketal grouping.

The ethyleneketals of aliphatic aldehydes or ketones, i. e., the 1,3-dioxolanes utilized in accordance with the present invention to form ethyleneketals of steroid ketols may be illustrated by the following formula:

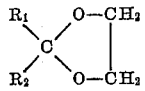

In the above formula, $R_1$ and/or $R_2$ represents hydrogen or an alkyl radical preferably a lower alkyl radical. For example, $R_1$ may represent a methyl group and $R_2$ an ethyl group as in 2,2-methyl ethyl-1,3-dioxolane, $R_1$ may represent hydrogen and $R_2$ a methyl group as in 2-methyl-1,3-dioxolane and both $R_1$ and $R_2$ may represent a methyl group as in 2,2-dimethyl-1,3-dioxolane.

In practicing the interchange reaction between the steroidal ketone and the 1,3-dioxolane, the steroidal ketone, which may have other substituents such as hydroxy groups, esterified hydroxy groups, halogen substituents, etc., may be mixed with the dioxolane and then reacted under reflux. Preferably, however, the reaction takes place in a vessel fitted with a fractionating column so that the aliphatic ketone or aldehyde formed during the reaction may be removed during the course of reaction. Further, the reaction may be accelerated by the use of an acid catalyst such as p-toluenesulphonic acid monohydrate. The reaction may be utilized for the production of a 3-ethylene ketal of a 3-keto steroid, a 3-monoethyleneketal of a 3,17-diketo steroid, a 3-monoethylene ketal of a 3,20-diketo steroid, the 20-ethyleneketal of a 20-keto steroid or of a polyethyleneketal of a polyketo-steroid as for example the 3,20-diethyleneketal of a 3,20-diketo steroid. The steroids may be saturated or unsaturated and may be provided with other substituents as for example a bromo group in position C–4 or C–2.

The substantially quantitative production of the ethyleneketals as set forth herein renders the present method especially suitable for the protection of keto groups for subsequent reaction on other portions of the molecule. Thus, a 3-monoethyleneketal of a steroidal 3,17-diketone may be further treated with a reducing agent such as hydrogen in the presence of Raney nickel or lithium aluminum hydride to prepare the corresponding 3-monoethyleneketal of the steroidal 3-ketone-17-alcohol.

Alcoholic groups present in the molecule of the steroidal ethyleneketal may be esterified, preferably with an organic acid anhydride or chloride in the presence of an excess of an organic base.

Thus, the 3-monoethyleneketal of testosterone on treatment with propionic anhydride in the presence of an excess of pyridine gives the 3-monoethyleneketal of testosterone propionate. Similar treatment of ethyleneketals of steroidal hydroxy-ketones with acid anhydride or chlorides especially lower fatty acid or benzoic acid anhydrides or chlorides served to produce corresponding esters.

Further bromo substituted ethyleneketals may be dehydrobrominated preferably with ethyleneglycol in the presence of an organic base without effecting the ketal grouping. Thus, α-bromo compounds which may be readily prepared from the corresponding steroidal ketone can be treated to form the corresponding ethyleneketal, and the ketal dehydrobrominated to the corresponding α-β-unsaturated compound.

The ethyleneketals of the present invention may be converted back to the ketone by heat treatment with acid such as refluxing with p-toluenesulfonic acid.

The following specific examples serve to illustrate but are not intended to limit the present invention:

Example I

A mixture of 1 g. of $\Delta^4$-androsten-3,17-dione, 16 cc. of 2,2-methyl ethyl-1,3-dioxolane and 15 mg. of p-toluenesulfonic acid monohydrate was heated in an oil bath, maintaining a slow distillation through a packed column to complete the interchange. 10 cc. of a mixture of butanone and methyl ethyl-dioxolane were distilled in the course of 5½ hours. The cooled mixture was transferred with 20 cc. of benzene to a separatory funnel containing 10 cc. of a 5% aqueous solution of sodium bicarbonate in order to remove the acid catalyst. The organic layer was washed with 3 cc. of water, dried over anhydrous sodium sulphate and concentrated under vacuum at the temperature of the steam bath. The residue was digested with 8 cc. of methanol containing one drop of pyridine and left overnight in the refrigerator. There was obtained 840 mg. of the crystalline 3-monoethyleneketal of androstendione with a melting point of 197°–198° C.

Example II

A solution of 10 g. of Δ-cholesten-3-one and 180 mg. of p-toluenesulfonic acid monohydrate in 150 cc. of 2,2-methyl ethyl-1,3-dioxolane was treated by the method described in Example I, except for heating 6 hours. 9.3 g. were obtained of the ethyleneketal of cholestenone, with a melting point of 131°–132° C.

Example III

A mixture of 10 g. of testosterone, 100 cc. of 2,2-methyl ethyl-1,3-dioxolane, 180 mg. of p-toluenesulfonic acid monohydrate and 120 cc. of methylcyclohexane was slowly refluxed for 7 hours according to the method described in Example I. In the course of this time, 100 cc. of the mixture of solvents was collected. 9.0 g. were obtained of the ethyleneketal of testosterone with a melting point of 183°–184° C.

*Example IV*

Following exactly the procedure described in the previous example, 10 g. of testosterone propionate yielded 7.9 g. of the ethyleneketal of testosterone propionate with a melting point of 201°–202° C.

*Example V*

By the method described in Example I, 10 g. of progesterone afforded 9.0 g. of the 3,20-diethyleneketal of progesterone with a melting point of 172°–173° C.

*Example VI*

By the method described in Example I, 10 g. of cholestan-3-one in a reaction time of 4½ hours yielded 9.6 g. of the ethyleneketal of cholestanone with a melting point of 113° C.

*Example VII*

1 g. of etiocholan-17-ol-3-one acetate was refluxed for 12 hours with 10 cc. of 2-methyl-1,3-dioxolane in the presence of 10 mg. of p-toluenesulfonic acid monohydrate. The acetaldehyde formed during the reaction separated in the condenser in the form of a polymer. Following the method described in Example I, 920 mg. were obtained of the ethyleneketal of etiocholan-17-ol-3-one acetate, with a melting point of 120° C.

*Example VIII*

A mixture of 15 cc. of 2,2-methyl ethyl-1,3-dioxolane, 7 mg. of p-toluenesulfonic acid monohydrate and 500 mg. of 16,17-oxido-$\Delta^5$-pregnen-3$\beta$-ol-20-one acetate (prepared according to the method of Julian, J. A. C. S., 72, 5146 (1950) was heated in an apparatus with a distillation column as described in the previous examples. Only a few drops distilled at the beginning. When the temperature reached the boiling point of the dioxolane derivative (118° C.), the discharge stopcock was closed so that condensate returned to the column and then the stopcock was opened only twice a day to allow the distillation of a few drops. Every time the stopcock was opened, a few crystals of p-toluenesulfonic acid were added through the column in order to speed the reaction. The total amount of p-toluenesulfonic acid added in this manner was 7 mg. After repeating these operations during 6 days, it was noticed that on opening the stopcock the temperature in the column did not lower, thus indicating that the reaction was complete. The reaction mixture was treated in accordance with the method described in Example I. Digestion of the residue from the evaporation with 5 cc. of methanol containing one drop of pyridine, followed by cooling in the refrigerator for 12 hours yielded 430 mg. of the ethyleneketal of 16,17-oxido-$\Delta^5$-pregnene-3$\beta$-ol-20-one acetate, with a melting point of 191° to 193° C.

*Example IX*

Following the method described in Example VIII, except that no additional amounts of catalyst were added and that the reaction was complete after 20 hours, 2 g. of $\Delta^{5,16}$-pregnadien-3$\beta$-ol-20-one with 30 cc. of 2,2-methyl ethyl dioxolane and 30 mg. of p-toluenesulfonic acid monohydrate yielded 1.7 g. of the ethyleneketal of $\Delta^{5,16}$-pregnadien-3$\beta$-ol-20-one, with a melting point of 157°–158° C.

*Example X*

A solution of 5 g. of 2-bromocholestan-3-one in 60 cc. of 2,2-methyl ethyl dioxolane, with 60 mg. of p-toluenesulfonic acid monohydrate, was slowly distilled through a column packed with stainless steel turnings. The column was fitted with a heating jacket and a distilling head connected to a stopcock. A few cc. were distilled until the temperature in the upper part of the column had reached the boiling point of methylethyldioxolane. The stopcock was closed and the mixture was refluxed for some time. Approximately every two hours a slight drop of the temperature was noticed in the top part of the column, and then the stopcock was opened to distill a few drops, thus restoring the original temperature. After two days no depression in the temperature was noticed and the reaction was considered complete. The residual volume was 15–20 cc. 0.4 cc. of pyridine was added and with the aid of 40 cc. of boiling methanol the product was transferred to a beaker. The product crystallized after leaving the mixture overnight in the refrigerator. It afforded 4.4 g. of the ethyleneketal of 2-bromocholestanone, with a melting point of 128°–129° C.

*Example XI*

A solution of 3.1 g. of 4-bromoetiocholan-17$\beta$-ol-3-one acetate and 40 mg. of p-toluenesulfonic acid monohydrate in 35 cc. of 2,2-dimethyl-1,3-dioxolane was refluxed during 3 days by the procedure described in Example X, opening the discharge stopcock every two hours. It yielded 2.0 g. of the ethyleneketal of 4-bromoetiocholan-17$\beta$-ol-3-one, with a melting point of 204°–205° C.

*Example XII*

A solution of 535 mg. of the 3-monoethyleneketal of $\Delta^4$-androsten-3,17-dione in 65 cc. of ethanol was hydrogenated in the presence of Raney nickel catalyst. The absorption of hydrogen ceased after one mol of hydrogen had been consumed. The catalyst was filtered and the solution was concentrated under reduced pressure after adding 5 cc. of 2,2-methyl, ethyl-1,3-dioxolane. The product crystallized after standing overnight in the refrigerator, to give 472 mg. of the ethyleneketal of testosterone with a melting point of 181°–182° C., $[\alpha]_D$ —34° (chloroform). Two further crystallizations from methanol raised the melting point to 182°–183° C., $[\alpha]_D$ —41.7°.

*Example XIII*

A solution of 10 g. of the 3-monoethyleneketal of $\Delta^4$-androsten-3,17-dione in 250 cc. of ether was refluxed for 2 hours with 2 g. of lithium aluminum hydride. The mixture was cooled and the excess reagent was decomposed by the careful addition of a few drops of water and then diluted with 200 cc. of water. The ether layer was washed with 5% sodium hydroxide solution and water, dried over anhydrous potassium carbonate, dried and evaporated to dryness under vacuum. Crystallization of the residue from methanol afforded 7.9 g. of the ethyleneketal of testosterone with a melting point of 182°–184° C., $[\alpha]_D$—42°. The product was dissolved in 400 cc. of acetone and after adding 300 mg. of p-toluenesulfonic acid the mixture was refluxed for 12 hours. 400 cc. of water were then added drop by drop to the solution under vigorous stirring and cooling. The precipitate thus obtained was collected and washed with water to give testosterone, with a melting point of 151°–153° C., in nearly quantitative yield.

*Example XIV*

A solution of 500 mg. of the ethyleneketal of testosterone in 3.5 cc. of pyridine and 1.5 cc. of propionic anhydride was heated during 14 hours at a temperature of 95° C., and then 3 cc. of dimethylaniline were added in order to remove the excess of propionic anhydride. The mixture was concentrated in vacuum nearly to dryness and the residue was dissolved in 10 cc. of hot methanol. The ethyleneketal of testosterone propionate crystallized after 14 hours in the refrigerator. Several crops were obtained from the mother liquors to give a yield of 505 mg. of crystals which after one crystallization from methanol containing one drop of pyridine had a melting point of 201°–202° C. The melting point of this substance showed no depression in mixture with a sample of the ethyleneketal of testosterone propionate prepared from testosterone propionate by interchange with methylethyldioxolane.

*Example XV*

A solution of 340 mg. of the ethyleneketal of 4-bromo-coprostanone in 10 cc. of a normal solution of potassium hydroxide in alcohol was slowly heated in an oil bath until the temperature reached 150° C. in order to remove the alcohol. During this evaporation 15 cc. of ethyleneglycol were slowly added and when most of the alcohol had been removed in this manner, a condenser was attached to the flask and the mixture was refluxed for 20 hours. Nearly no decoloration was observed during this period. The cooled mixture was transferred to a separatory funnel containing ether and the glycol was removed by repeated washings with water. The ether was evaporated and the product crystallized by addition of hot alcohol and cooling in the refrigerator. It yielded 240 mg. of the ethyleneketal of $\Delta^4$-cholestenone with a melting point of 130°–131° C., which proved to be identical by comparison with an authentic sample.

We claim:

1. A process for the selective production of a steroidal hydroxy-ketone compound from a steroidal polyketone selected from the class consisting of compounds of the androstane series and compounds of the pregnane series which comprises reacting the steroidal ployketone with a 1,3-dioxolane having the following formula:

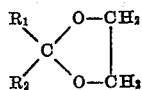

wherein each of $R_1$ and $R_2$ is selected from the group consisting of hydrogen and an alkyl radical, to selectively form the corresponding ethyleneketal with only certain of the keto groups and thereafter reducing the free keto groups to the corresponding hydroxy group with a reducing agent.

2. The process of claim 1 wherein the reducing agent is hydrogen in the presence of a Raney nickel catalyst.

3. The process of claim 1 wherein the reducing agent is hydrogen in the presence of a Raney nickel catalyst, the steroidal polyketone is $\Delta^4$-androsten-3,17-dione and the product is the ethyleneketal of testosterone.

4. The process of claim 1 wherein the reducing agent is lithium aluminum hydride, the steroidal polyketone is $\Delta^4$-androsten-3,17-dione and the product is the ethyleneketal of testosterone.

5. A process for the production of an ethyleneketal of a steroidal ketone selected from the class consisting of compounds of the androstane series and compounds of the pregnane series which comprises reacting the steroidal ketone with a 1,3-dioxolane of the following formula:

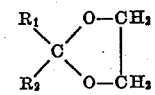

wherein each of $R_1$ and $R_2$ is selected from the group consisting of hydrogen and an alkyl radical.

6. The process of claim 5 wherein the steroidal ketone is reacted with the 1,3-dioxolane in the presence of an acid catalyst.

7. The process of claim 6 wherein the acid catalyst is p-toluenesulfonic acid monohydrate.

8. A process for the production of an ethyleneketal of a steroidal ketone selected from the class consisting of compounds of the androstane series and compounds of the pregnane series which comprises reacting said ketone with a 2-lower alkyl-1,3-dioxolane.

9. The process of claim 8 wherein the steroidal ketone is a 3-ketone.

10. The process of claim 8 wherein the steroidal ketone is a 3,17-diketone and a 3-monoethyleneketal is formed.

11. The process of claim 8 wherein the steroidal ketone is a 3,20-diketone and diethyleneketal is formed.

12. A process for the production of the 3-monoethyleneketal of $\Delta^4$-androsten-3,17-dione which comprises reacting $\Delta^4$-androsten-3,17-dione with 2,2-methyl, ethyl-1,2-dioxolane.

13. A process for the preparation of the ethyleneketal testosterone which comprises reacting testosterone with 2,2-methyl, ethyl-1,3-dioxolane.

14. A process for the preparation of the ethyleneketal of testosterone propionate which comprises reacting testosterone propionate with 2,2-methyl, ethyl-1,3-dioxolane.

15. A process for the preparation of the ethyleneketal of 16,17-oxido-$\Delta^5$-pregnen-3$\beta$-ol-20-one acetate which comprises reacting 16,17-oxido-$\Delta^5$-pregnen-3$\beta$-ol-20-one acetate with 2,2-methyl, ethyl-1,3-dioxolane.

16. A process for the preparation of the ethyleneketal of $\Delta^{5,16}$-pregnadien-3$\beta$-ol-20-one which comprises reacting $\Delta^{5,16}$-pregnadien-3$\beta$-ol-20-one with 2,2-methyl, ethyl-1,3-dioxolane.

References Cited in the file of this patent

UNITED STATES PATENTS

| | | |
|---|---|---|
| 2,288,854 | Stavely | July 7, 1942 |
| 2,302,636 | Koster | Nov. 17, 1942 |
| 2,356,154 | Fernholz | Aug. 22, 1944 |
| 2,378,198 | Fernholz | June 26, 1945 |
| 2,622,081 | Bernstein | Dec. 16, 1952 |
| 2,623,885 | Miescher | Dec. 20, 1952 |
| 2,646,434 | Bernstein | July 21, 1953 |
| 2,648,662 | Julian | Aug. 11, 1953 |
| 2,671,095 | Levin | Mar. 2, 1954 |
| 2,674,606 | Levin | Apr. 6, 1954 |

FOREIGN PATENTS

| | | |
|---|---|---|
| 238,145 | Switzerland | Oct. 1945 |
| 876,816 | France | 1942 |

OTHER REFERENCES

Poos: J. Am. Chem. Soc., vol. 75, January 1952, pp. 422–29.

Romo: J. Am. Chem. Soc., October 1951, pp. 4961–4.

Antonucci: J. Am. Chem. Soc., October 1952, pp. 1369–74.

Antonucci: J. Am. Chem. Soc., October 1952, pp. 1341–50.